(12) United States Patent
Brinks et al.

(10) Patent No.: US 7,044,434 B2
(45) Date of Patent: May 16, 2006

(54) HIGH RECOVERY SONIC GAS VALVE

(75) Inventors: Barry T. Brinks, Fort Collins, CO (US); Jeff A. Gessaman, Fort Collins, CO (US); Barry Suelter, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 7 days.

(21) Appl. No.: 10/796,811

(22) Filed: Mar. 9, 2004

(65) Prior Publication Data

US 2005/0199840 A1    Sep. 15, 2005

(51) Int. Cl.
*F16K 47/00* (2006.01)
*F16L 55/02* (2006.01)

(52) U.S. Cl. ................................. 251/122; 251/124
(58) Field of Classification Search .............. 251/118, 251/120, 122, 123, 124
See application file for complete search history.

(56) References Cited

U.S. PATENT DOCUMENTS

| | | | | |
|---|---|---|---|---|
| 3,889,537 A | * | 6/1975 | Khuzaie .................. | 73/861.64 |
| 4,413,646 A | * | 11/1983 | Platt et al. .................. | 137/240 |
| 4,707,278 A | * | 11/1987 | Breyer et al. ............... | 251/122 |
| 4,721,284 A | * | 1/1988 | Bankard ...................... | 251/86 |
| 6,105,614 A | * | 8/2000 | Bohaychuk et al. ..... | 137/625.3 |

* cited by examiner

*Primary Examiner*—Edward K. Look
*Assistant Examiner*—John K. Fristoe, Jr.
(74) *Attorney, Agent, or Firm*—Reinhart Boerner Van Deuren P.C.

(57) ABSTRACT

A high recovery sonic gas valve design with the inlet flow entering transverse and orthogonal to the outlet flow is presented. The configuration cancels the effects of the inlet flow entering orthogonal to the axis of the nozzle and diffuser. The inlet passage is curved in a manner to let the flow enter along the centerline of the nozzle and diffuser. The nozzle is contoured and provides upstream flow impedance. The diffuser is contoured with the area gradient varying from a low positive value at the nozzle throat then to a maximum value and finally dropping off significantly to near zero prior to the nozzle exit. The diffuser is nearly cylindrical and may extend past the valve outlet flange and protrude into adjacent piping.

44 Claims, 8 Drawing Sheets

HIGH RECOVERY SONIC GAS VALVE

FIELD OF THE INVENTION

The present invention relates generally to gas valves, and more particularly relates to sonic gas valves.

BACKGROUND OF THE INVENTION

Accurate control of mass flow rates is a requirement in many industries. For example, in the process industry, gas flow is controlled. In the gas turbine industry, mass flow rate is used to meter fuel into gas turbines. Mass flow is determined from the equation $\dot{m}=\rho V A$ where $\dot{m}$ is the mass flow rate, $\rho$ is the gas density, $V$ is the velocity of the gas, and $A$ is the cross-sectional area where the gas is flowing.

Upstream pressure and temperature measurements are used to derive the gas density. To measure the velocity in subsonic valves, downstream pressure is also measured and velocity is derived based on the pressure differential of the upstream and downstream pressures. However, the downstream pressure measurement reduces the accuracy and reliability of the flow control due to the use of both upstream and downstream sensors.

As a result of the reduced accuracy and reliability, the industry developed sonic gas valves where the velocity in the throat (narrowest section) of the nozzle of the valve is Mach 1.0. When the gas velocity is Mach 1.0 in the throat, downstream pressure signals cannot propagate upstream through the nozzle throat because pressure signals cannot travel faster than the speed of sound. One result of this fact is that the upstream flow into the nozzle is not affected by downstream pressure when the velocity in the nozzle throat is Mach 1.0. Hence, even when the downstream pressure is lowered, the velocity in the nozzle throat is not affected. As a result, downstream pressure measurements no longer are required to determine velocity.

Achieving sonic flow (i.e., gas velocity is Mach 1.0) is more easily achievable when the valve inlet pipe is in-line with the outlet pipe (e.g., the center-lines are co-linear). However, the valve inlet pipe and outlet pipe are not in-line in many installations. In valves where the inlet pipe is orthogonal to the outlet pipe, the gas flow pattern essentially turns ninety degrees from inlet to outlet. The flow coming in from a side rather than the centerline of the discharge pipe causes the flow in the valve to be non-uniform around the valve nozzle throat. As a result, sonic flow is more difficult to achieve and higher pressure drops are required to achieve sonic flow. The higher pressure drop may account for significant energy loss and adversely affect the efficiency of the system.

BRIEF SUMMARY OF THE INVENTION

The invention provides a gas valve design that achieves sonic flow at lower pressure ratios (P1/P2) in variable area critical (sonic) venturi designs than in conventional designs. The valve design provides a curved flow path for the inlet passage to force inlet flow into the nozzle area in a more uniform manner causing a highly similar flow condition at each point around the circumference of the nozzle flow area annulus.

The invention further provides a converging contoured restriction located upstream of the nozzle throat to straighten the flow. The converging contoured restriction is shaped such that the area gradient starts at nearly zero (e.g., slightly negative) and becomes increasingly negative closer to the nozzle throat.

The diffuser downstream of the nozzle is shaped such that the area gradient starts out as a small positive value and increases up to a maximum value and then drops off at the outlet of the diffuser where the flow path is nearly cylindrical in shape. A portion of the axial length of the largest diameter location for the diffuser portion has an area gradient near zero. In one embodiment, the diffuser portion extends pass the valve outlet flange and protrudes into the adjacent piping when installed.

These and other advantages of the invention, as well as additional inventive features, will be apparent from the description of the invention provided herein.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present invention provides a gas control valve that controls the flow of gas (including air) and/or fuel for an industrial or gas turbine or other flow control system that cancels or greatly diminishes the effect on inlet flow entering orthogonal to the axis of the valve nozzle and diffuser. Several strategies shall be described to optimize the critical pressure ratio. The critical pressure ratio (P1/P2) for a valve is defined as the ratio of inlet pressure (P1) to outlet pressure (P2) where the valve flow rate drops below some percentage of the sonic flow rate. All gas valves will provide sonic flow at Mach 1.0 in the throat of the valve with pressure ratios (P1/P2) above approximately 2.0 (depending on gas properties). The valve described herein using the features described provides sonic flow throughout the nozzle throat for pressure ratios (P1/P2) at or above approximately 1.04 in one embodiment. Some of these techniques may also be applied to other types of valves including liquid valves to reduce losses and increase the maximum flow rates. The embodiment described herein has a nearly circular cross section to the flow path and is for a 90-degree bend in the flow path in the valve. The features and strategies are also applicable to other flow path cross section shapes, such as a rectangular cross section, and also for other flow path contours, such as a straight linear flow path or a typical globe valve design with inlet and outlet flanges in-line and orthogonal to the nozzle centerline and subsonic valves.

Figure 1:
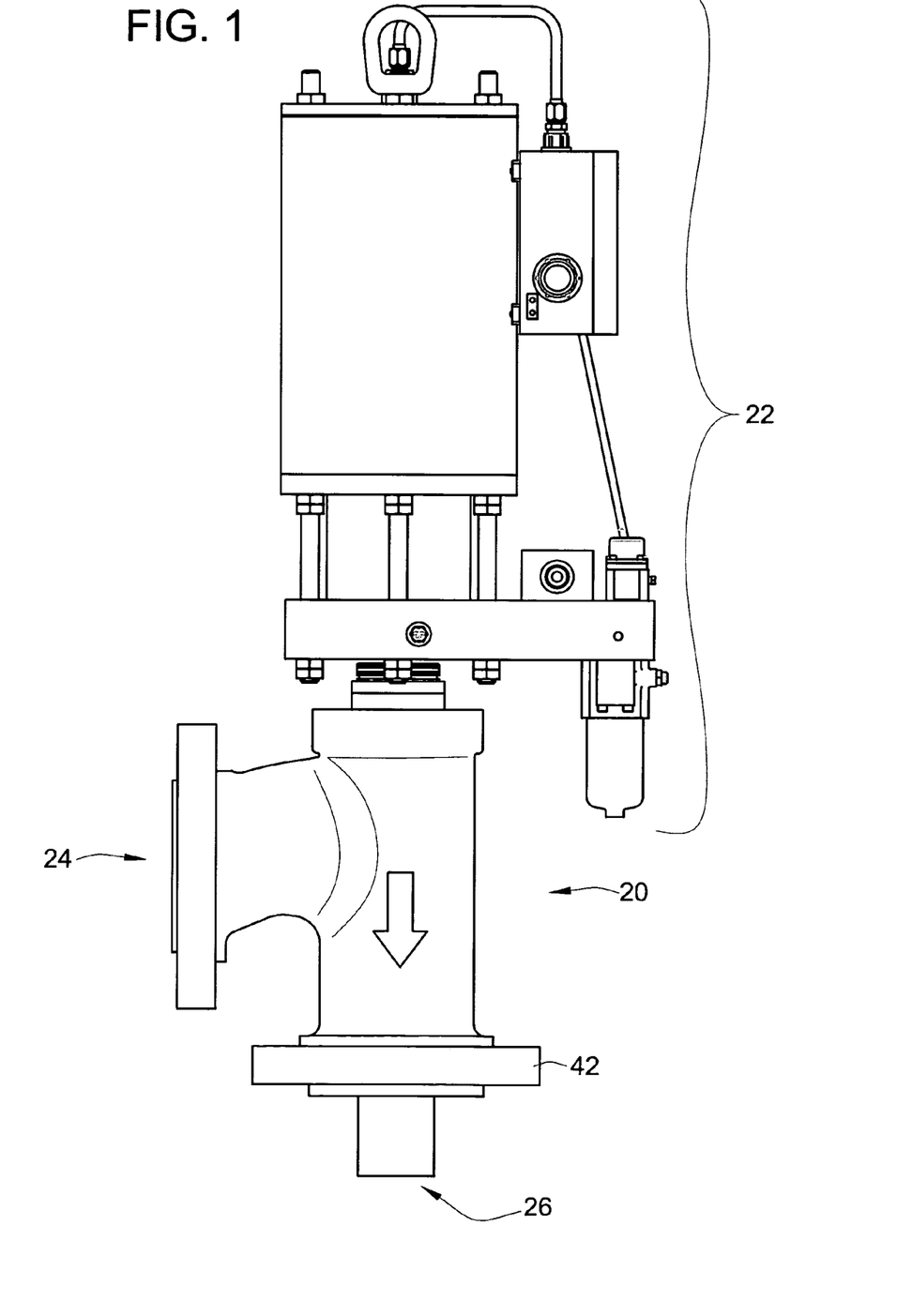
FIG. 1 is a perspective view of a sonic gas valve in accordance with the present invention with a conventional actuator mechanism mounted on top of the valve.

Turning now to the drawings, wherein like reference numerals refer to like elements, an exemplary embodiment of a gas control valve 20 according to the present invention is illustrated in FIG. 1. As will be appreciated from the following description, the gas control valve 20 is a valve that diminishes or cancels the effects of inlet flow entering orthogonal to the axis of the valve nozzle and diffuser.

Turning now to FIGS. 1 to 4, the valve body 20 has a gas inlet 24, a gas outlet 26 and a nozzle throat 28 for a valve needle 30. The actuator 22 may be any type of actuator that controls the movement of valve needle 30 relative to the nozzle throat 28. Actuators are well known and need not be discusses at length herein. The valve needle 30 has a contoured surface 32 that is shaped to provide a desired gas flow versus actuator piston stroke (i.e., position). The flow path designated by arrows 34 is a curved flow path in the inlet passage 36 to force the inlet flow into the nozzle 38 more uniformly. The nozzle 38 has a converging flow where the flow path cross-section area is reducing along the direction of the flow. The curved flow path helps cancel the effects of the inlet flow being orthogonal to the nozzle and diffuser axis by having the flow turned into the direction parallel to the nozzle centerline at a location upstream of the nozzle throat 28.

The cross-section flow area for the inlet flow path has a flow area that is smaller than the upstream inlet pipe cross section area, and this forces the flow in the desired direction. A larger cross section area inlet flow path could be used, but that may allow the flow to move along less optimal paths. The use of a smaller cross-section flow area can be applied to reduce losses significantly in other types of valves, including gas valves that are not sonic valves.

The small cross section inlet flow path starts adjacent to the upstream piping 40 (ref FIG. 2) in a manner that the flow path is eccentric to the inlet piping 40 such that the inlet flow path is as far as possible away from the outlet flange 42. This reduces the required curvature of the inlet flow path to allow the flow to enter the nozzle area along the nozzle centerline.

Figure 8:
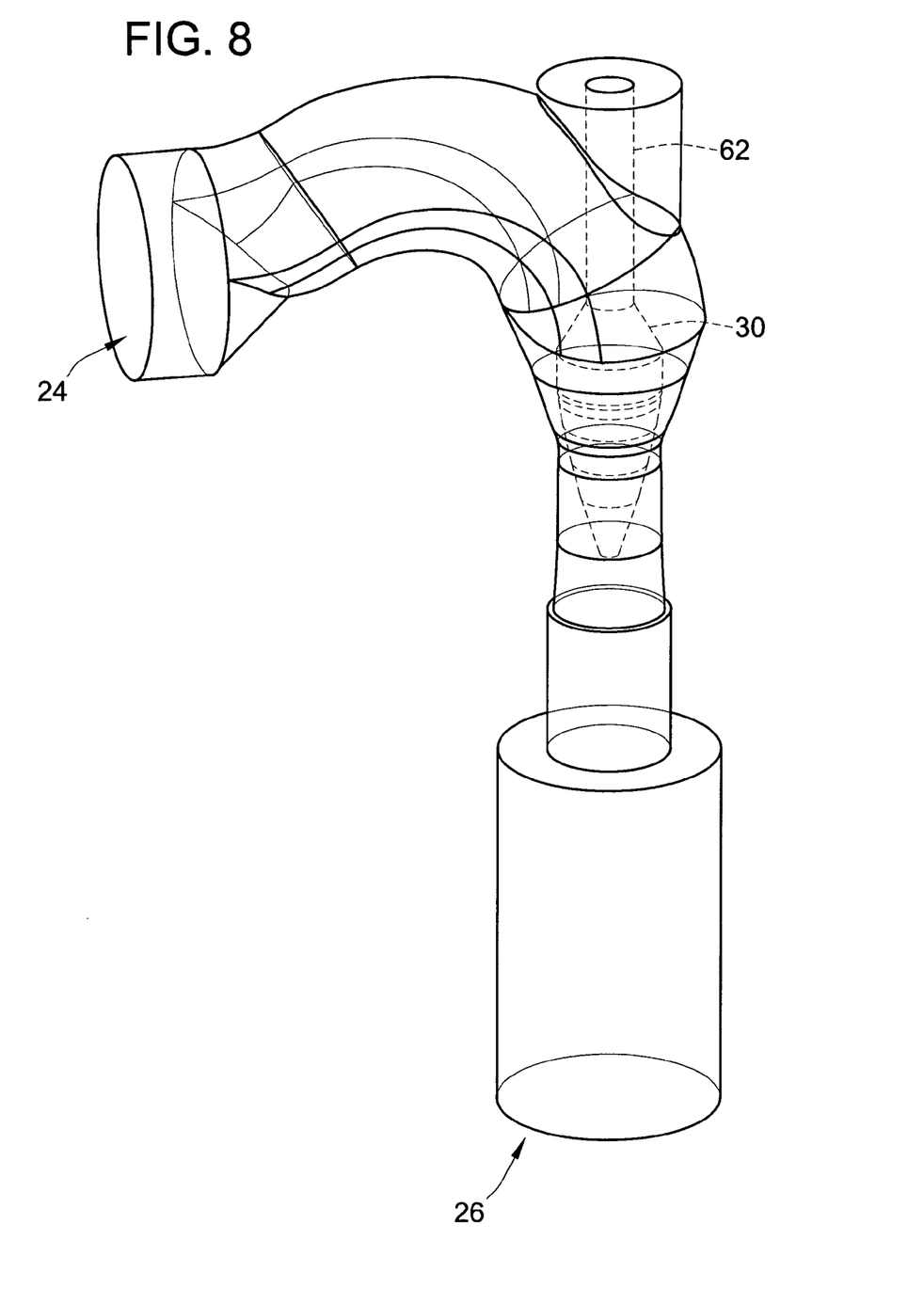
FIG. 8 is an isometric view of a curved flow path in accordance with the teachings of the invention.

In one embodiment, the cross section of the inlet flow passage is noncircular and is either nearly elliptical or shaped such that the radius of curvature measured orthogonal to the flow direction is smaller on the side of the flow path that has the smaller radius of curvature measured parallel to the flow direction (refer to FIG. 8). In either case, the larger dimension spans the flow path equivalent to the major axis of an ellipse that is orthogonal to the axis of the nozzle centerline. This further helps the flow turn into the direction parallel to the nozzle centerline at a location upstream of the nozzle throat 28.

The location of the inlet pipe 40 relative to the outlet pipe 54 is often constrained by industry standards. The inlet pipe 40 should be located as far as possible upstream of the nozzle throat 28 as measured along the nozzle and diffuser centerline axis to allow the flow to enter the nozzle area along the nozzle centerline. The curvature of the inlet flow path causes the flow to be turned into the direction parallel to the nozzle centerline at a location upstream of the nozzle throat. Such curvature is useful in many embodiments and is not limited to valves having an orthogonal inlet pipe.

A converging contoured restriction 44 is located upstream of the nozzle throat 28. The restriction 44 straightens the flow and helps cancel the effects of the inlet flow being orthogonal to the nozzle and diffuser centerline axis. The use of the curved inlet passage 36 in conjunction with the converging contoured restriction 44 prevents the flow from separating along the inlet passage geometry and provides a thick boundary layer at the nozzle 38. The thicker boundary layer increases the turbulence in the diffuser boundary layer and reduces the tendency for the flow to separate from the diffuser wall 46 of the diffuser 48. The turbulence in the diffuser boundary layer helps transport momentum in the main flow stream away from the wall into the diffuser boundary layer and thus increase the velocity of the boundary layer and also reduces the tendency for the boundary layer to stall and separate.

The use of the converging contoured restriction 44 allows an increase in the maximum flow rate since it allows the needle 30 to be pulled further out of the nozzle throat 28 while continuing to increase the gas flow rate. Without this feature, as the needle is extracted from the nozzle throat, there is a point where the flow no longer tends to increase. The shaping of the converging contoured restriction 44 is such that the area gradient starts at nearly zero (e.g., slightly negative) and continues to become more and more negative closer to the nozzle throat 28. The area gradient is the rate of change of the cross-sectional area per linear unit (e.g., inch) of axial distance along the flow direction The diffuser 48 has a diverging flow where the flow path cross-section area is increasing along the direction of the flow. The shape of the diffuser 48 that is downstream of the nozzle 38 is such that the area gradient starts out as a small positive value near the nozzle throat 28 and then reaches a maximum and then drops to nearly zero at the outlet 50 of the diffuser where the flow path is nearly cylindrical. The end of the diffuser can be a cylindrical or nearly cylindrical tube 52 (i.e., a tube of nearly constant cross-sectional area). In one embodiment, the cross section area of the diffuser sleeve is such that the area initially reduces just downstream of the nozzle throat 28 with a convex curvature in the direction along the flow direction. This convex curvature continues with the cross section area increasing at axial locations along the direction of flow in the diffuser and toward the outlet flange 42. Near the diffuser outlet 50, the wall curvature becomes concave to reduce the area gradient until the wall is nearly cylindrical.

The shaping of the diffuser 48 to provide a small area gradient just downstream of the nozzle throat 28 causes the minimum inside diameter 29 (See FIG. 6) of the diffuser wall 46 to occur downstream of the nozzle throat. This feature allows a shorter stroke for valves that have a nearly linear flow rate increase per unit length when the valve needle 30 is extracted from the nozzle sleeve while maintaining a good critical pressure ratio at low valve openings.

Figure 2:
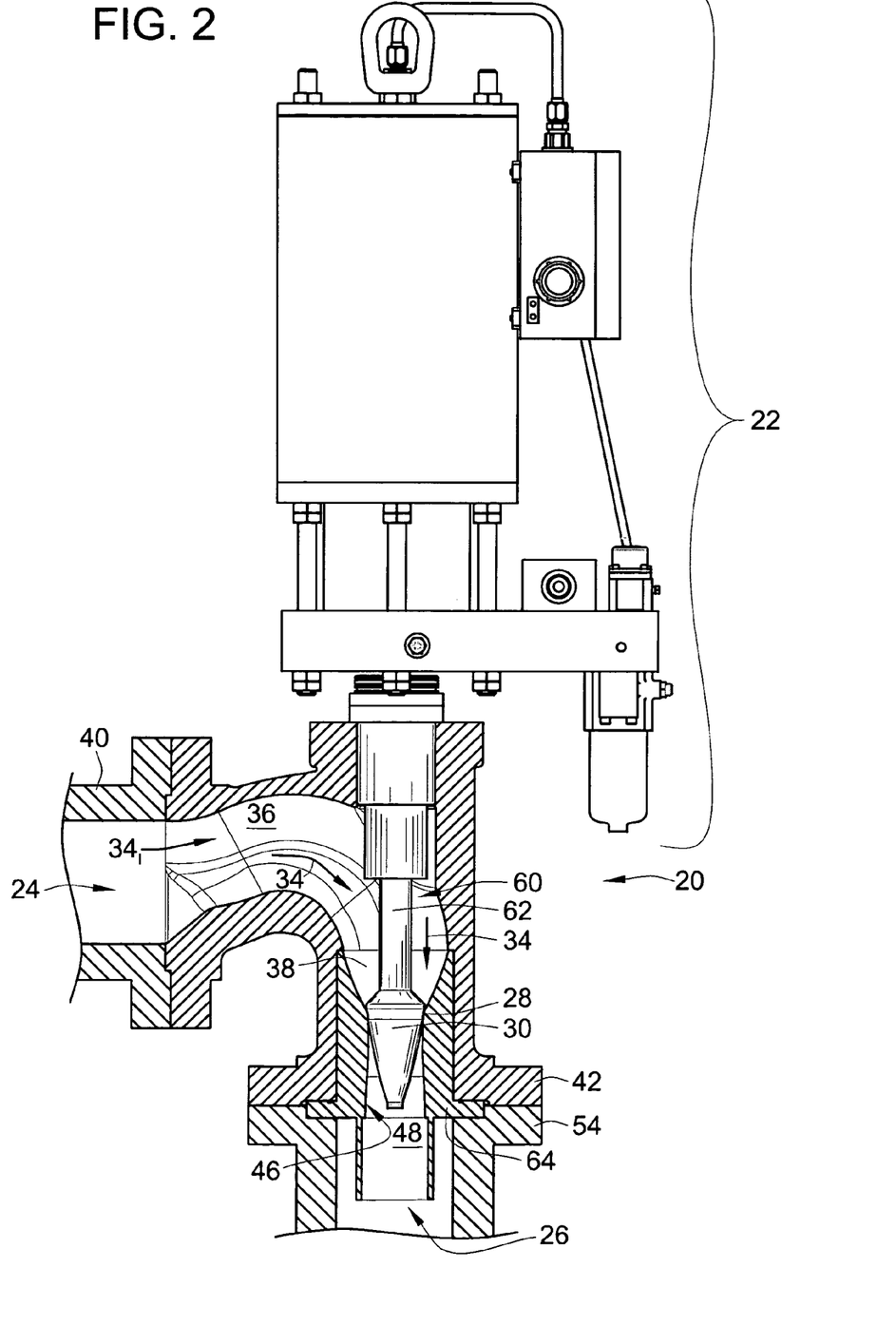
FIG. 2 is a cross section view of the sonic gas valve of FIG. 1.
Figure 3:
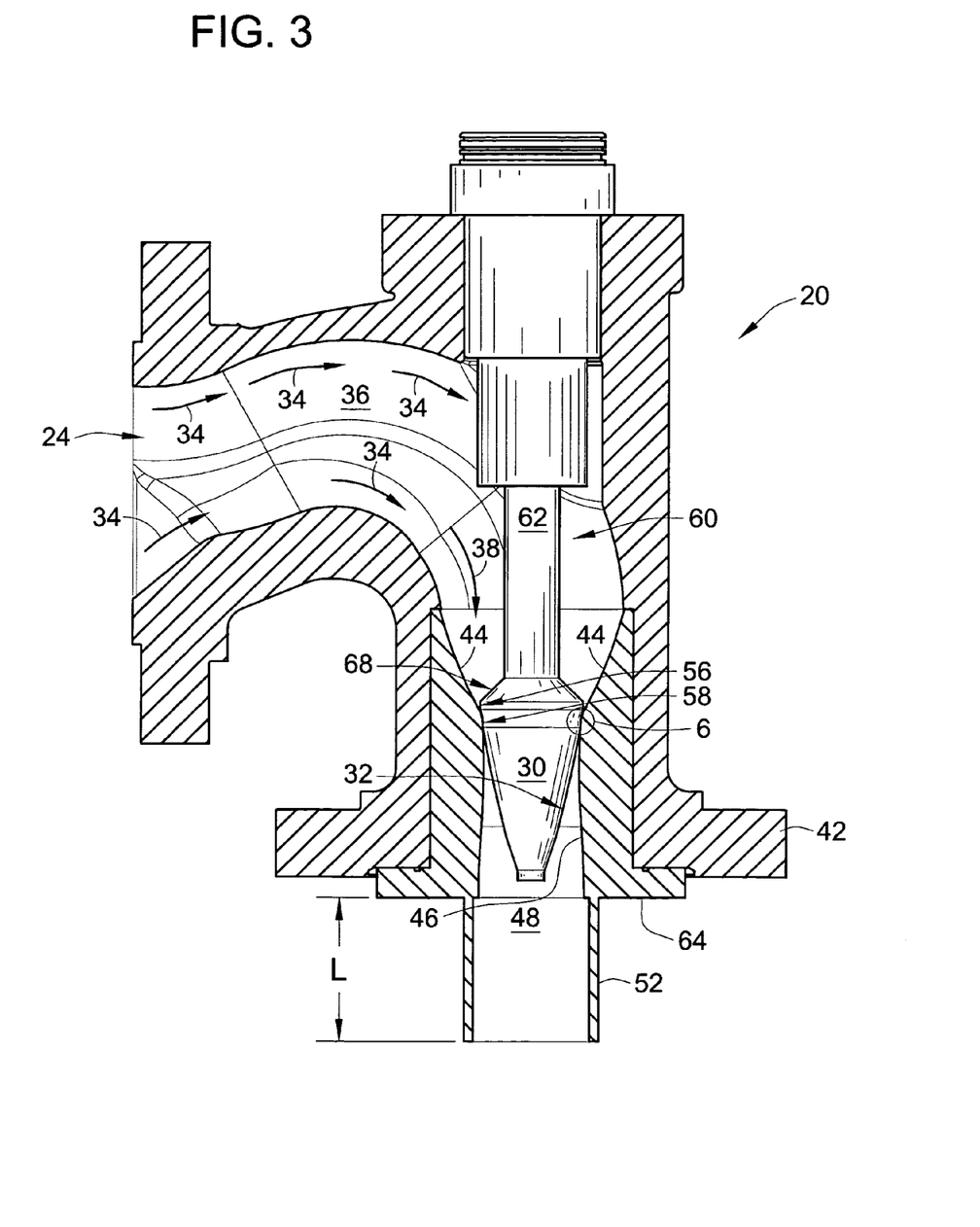
FIG. 3 is a partial cross-sectional view of the valve of FIG. 1 in a closed position with the valve needle shown without sectioning.

The axial length of the largest diameter location for the diffuser 48 with the area gradient near zero (approximately cylindrical) at the end is maximized and may even extend past the outlet flange of the valve and protrude into the adjacent piping 54 extending into the downstream (see FIG. 2). This extension 52 is nearly cylindrical and it can be tangent to the diffuser at the outlet flange location or have a slightly larger diameter due to an outward step in the diameter at the end of the diffuser. The length L of the extension 52 is not critical. The function of the extension 52 is to aid in keeping the exit direction of the gas flow to be in-line with the nozzle 38. In one embodiment, the axial length is four inches for a valve used for a six-inch diameter inlet and outlet pipe. The function of the extension 52 can also be met by designing the initial length of the outlet pipe 54 to be a reduced diameter equal to or just slightly larger than the exit diameter of the diffuser.

The needle 30 has a nearly cylindrical or a slightly tapered area 56 with a length to diameter ratio less than one or approximately equal to one located just upstream of the axial location where the needle 30 begins to taper to provide the flow vs. stroke characteristic for the valve 20. This feature prevents the flow from separating along the inlet side of the needle and provides a thick boundary layer along the needle. This thicker boundary layer increases the turbulence in the diffuser boundary layer and reduces the tendency for the flow to separate from the needle walls that project into the diffuser 48 downstream of the nozzle throat 28.

Figure 4A:
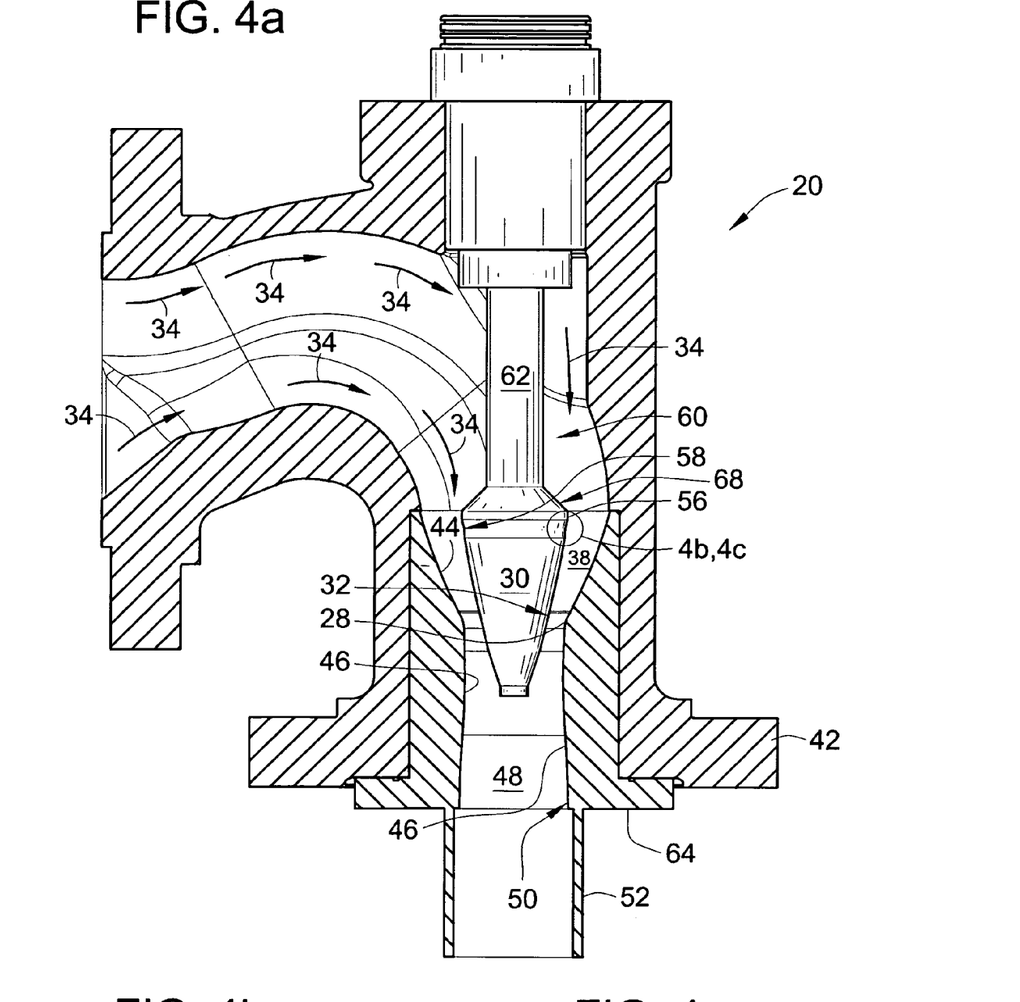
FIG. 4a is a partial cross-sectional view of the valve of FIG. 1 in a partially open position with the valve needle shown without sectioning.
Figure 4B:
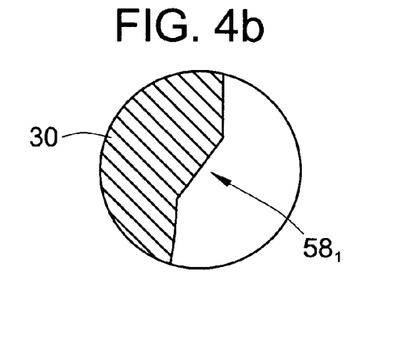
FIG. 4b is an enlarged cross-sectional view of the valve of FIG. 4a along 4b, 4c illustrating a conical step in accordance with the teaching of the invention.
Figure 4C:
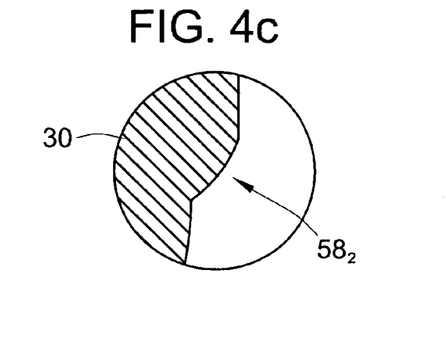
FIG. 4c is an enlarged cross-sectional view of the valve of FIG. 4a along 4b, 4c illustrating a spherical step in accordance with the teachings of the invention.
Figure 6:
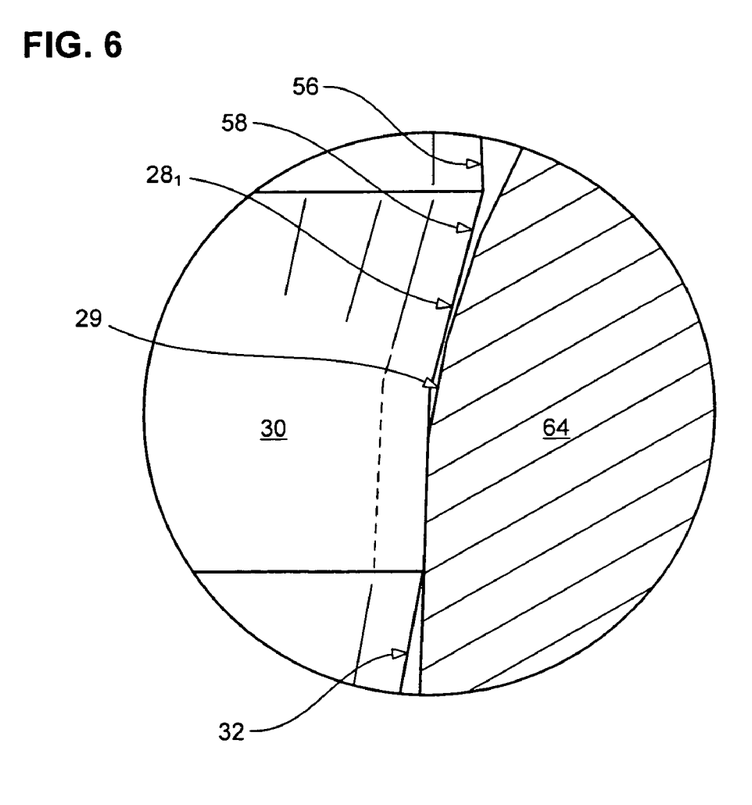
FIG. 6 is an enlarged cross-sectional view of the valve of FIG. 3 along section 6.

A conical step 58₁ (see FIG. 4*b*) or spherical step $58_2$ (see FIG. 4*c*) in the outside diameter of the needle 30 is used to contact the nozzle throat area 28 of the nozzle 38 to allow tight shutoff of gas flow in the fully closed valve position. FIG. 6 illustrates the shutoff with a conical step 58. It can be seen that the step 58 tightly contacts a section $28_1$ of the nozzle throat 28. The radial height of this step 58 is minimized to avoid flow separation such that the flow boundary layer that develops in the nearly cylindrical or a slightly tapered area 56 is not dissipated and increases the boundary layer thickness along the plug downstream of the step 58. In one embodiment, the length to diameter ratio of the nearly cylindrical or slightly tapered area 56 is approximately equal to one (see FIG. 7*b*).

The needle stem diameter in the area 60 upstream of the nearly cylindrical area 56 is reduced. This reduction in stem diameter minimizes the vorticity of the flow that passes by the needle stem 62 and flows through the nozzle throat on the side opposite of the inlet flow piping. A tapered transition 68 is used between the stem diameter and the nearly cylindrical or slightly tapered area 56 to avoid flow separation.

Figure 7A:
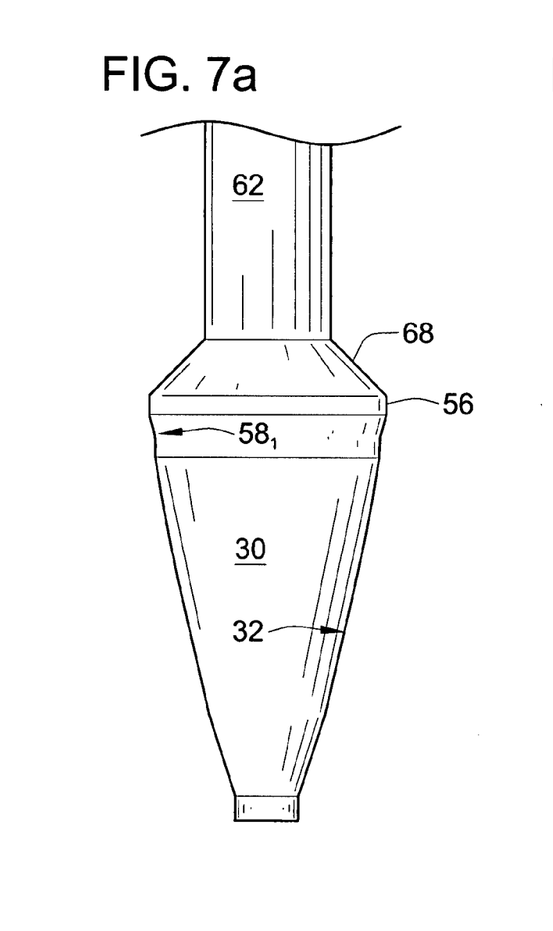
FIGS. 7a–7c illustrate embodiments of the valve needle in accordance with the teachings of the invention.
Figure 7B:
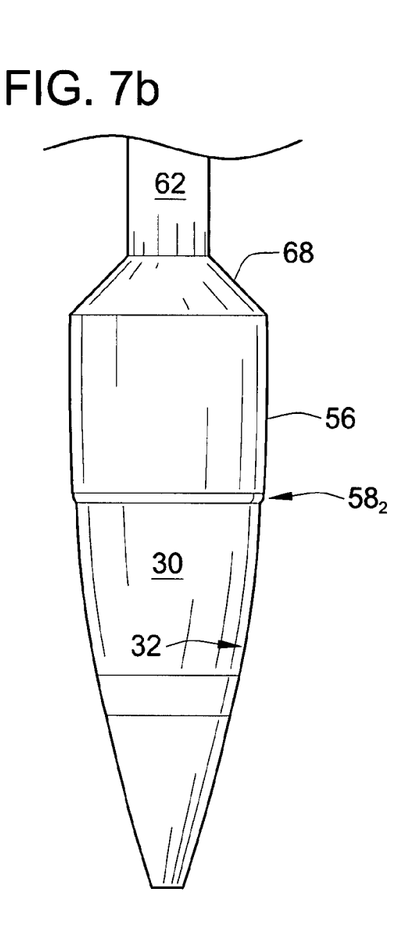
Figure 7C:
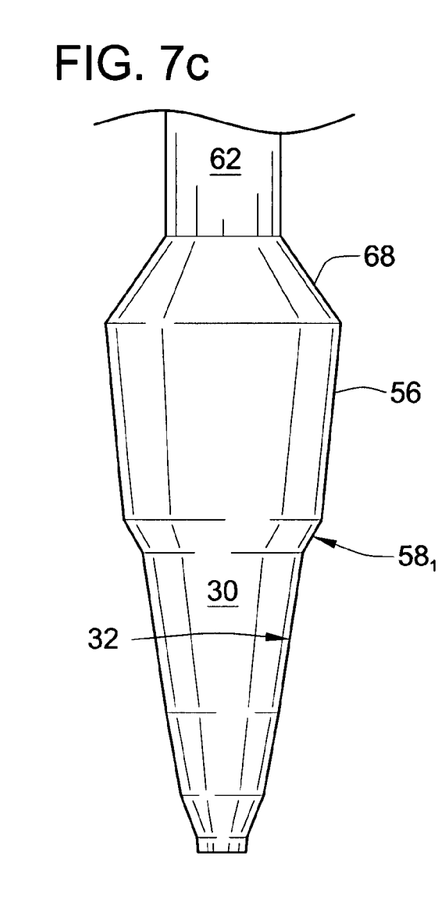

FIGS. 7*a* to 7*c* show different embodiments of the valve needle that can be used with the valve 20 of the present invention. FIG. 7*a* shows the nearly cylindrical or tapered area being short (length to diameter is less than one). FIGS. 7*b* and 7*c* show two embodiments where the length to diameter ratio of the nearly cylindrical or slightly tapered area 56 being approximately equal to one.

Figure 5A:
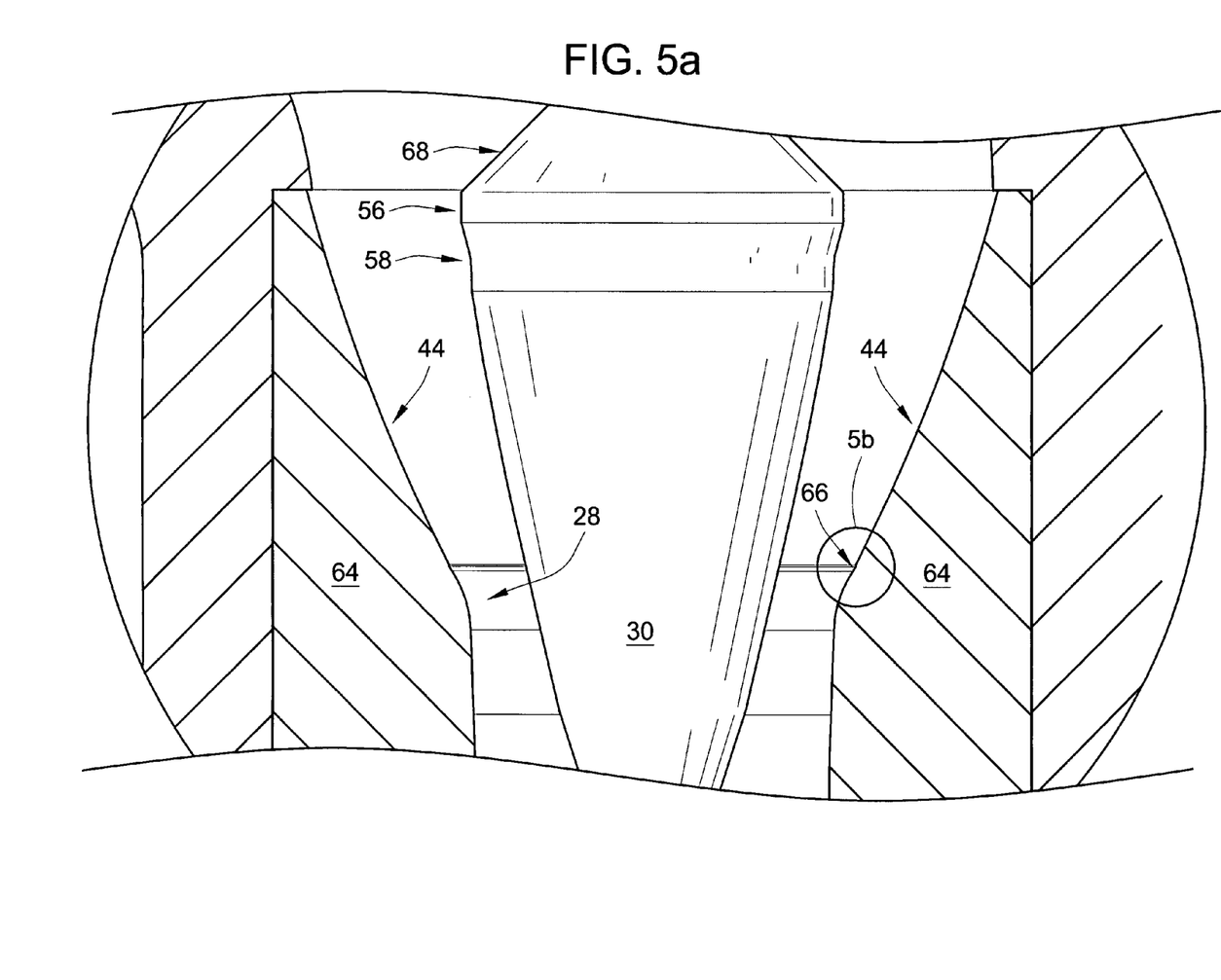
FIG. 5a is an enlarged view of the converging contoured restriction of the valve in accordance with the teachings of the present invention.
Figure 5B:
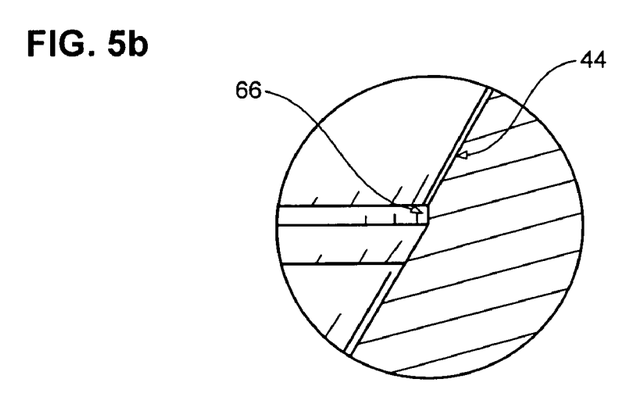
FIG. 5b is an enlarged view of the converging contoured restriction of FIG. 5a along 5b illustrating a location where there is allowed misalignment between machining operations in accordance with the teachings of the present invention.

During fabrication, machining operations (e.g., lathe operations) are done to machine the geometry of the nozzle throat 28, converging contoured restriction 44, and diffuser 48. In some valve fabrications, there is allowed misalignment between machining operations, which results in a discontinuity in the surface where machining operations meet. In one embodiment, the placement of any discontinuity in the machining operation to fabricate the nozzle/diffuser sleeve 64 due to machining mismatch as the part is made while cutting portions of the removed material from each end is placed upstream as far as possible of the nozzle throat 28. The allowed tolerance is an outward step 66 (see FIG. 5) such that the diameter downstream of the discontinuity is larger than the diameter at the discontinuity so that gas flow cascades off into the larger diameter.

Techniques to improve flow in valves have been described. These techniques improve the performance of flow in valves. The techniques described may be used separately or in combination. For example, the techniques of the reduced needle stem diameter, converging contoured restriction, diffuser extension, and area gradient patterns can be used in any type of valve, singly or in combination.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The foregoing description of various embodiments of the invention has been presented for purposes of illustration and description. It is not intended to be exhaustive or to limit the invention to the precise embodiments disclosed. For example, many of the features and techniques can also be used in subsonic valves. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A control valve body comprising:
   an inlet having an inlet passage;
   a nozzle area in fluid communication with the inlet passage, the nozzle area having a sloped nozzle throat and an uninterrupted annular converging contoured restriction upstream of the sloped nozzle throat, the sloped nozzle throat having surfaces tangent to a direction of fluid flow to inhibit flow separation; and
   an outlet in fluid communication with the sloped nozzle throat.

2. The valve body of claim 1 wherein the outlet has a diffuser that is shaped such that the area gradient of the diffuser increases from an initial start position near the sloped nozzle throat to a maximum value and drops to near zero at a boundary of the outlet.

3. The valve body of claim 1 wherein an inner diameter of an initial start position is smaller than the inner diameter of the sloped nozzle throat, the initial start position being downstream of the sloped nozzle throat.

4. The valve body of claim 1 wherein the outlet has an outlet flange and the diffuser extends beyond the outlet flange.

5. The valve body of claim 1 wherein the converging contoured restriction is shaped such that the area gradient of the converging contoured restriction starts at near zero and becomes increasingly negative as the converging contoured restriction nears the sloped nozzle throat.

6. The valve body of claim 1 wherein the inlet passage has a curved flow path.

7. The valve body of claim 6 wherein a cross-section of the inlet passage is shaped such that the radius of curvature measured orthogonal to flow direction is smaller on the side of the flow path that has a smaller radius of curvature measured parallel to the flow direction than the side of the flow path that has a larger radius of curvature measured parallel to the flow direction.

8. The valve body of claim 6 wherein a cross-section of the inlet passage has an approximately elliptical shape.

9. The valve body of claim 1 wherein the inlet is adapted to connect to an inlet pipe having a cross-sectional area and wherein the inlet passage has a cross-sectional area at a location adjacent the inlet that is smaller than the cross-sectional area of the inlet pipe.

10. The valve body of claim 9 wherein the inlet passage starts adjacent to the inlet pipe, the inlet passage configured to generate a flow path that is eccentric to the inlet pipe, the flow path immediately adjacent to the inlet pipe being as far away as possible from an outlet flange.

11. The valve body of claim 1 further comprising a valve needle adaptable to move between a closed position and an open position, the valve needle having a nearly cylindrical area upstream of an axial location where the valve needle begins to taper to provide the flow versus stroke characteristic of the valve body.

12. The valve body of claim 11 wherein the nearly cylindrical area has a length to diameter ratio of one of less than one and approximately equal to one.

13. The valve body of claim 11 wherein the valve needle has one of a conical step and a spherical step in the outside diameter of the valve needle, the one of the conical step and the spherical step adapted to contact the sloped nozzle throat to provide tight shutoff of gas flow in a fully closed valve position.

14. The valve body of claim 11 wherein the valve needle has a valve stem and the wherein the valve stem has a diameter that is smaller than the diameter of the nearly cylindrical area at a position upstream of the nearly cylindrical area.

15. The valve body of claim 14 further comprising a tapered transition between the valve stem having a smaller diameter and the nearly cylindrical area.

16. The valve body of claim 1 further comprising an outward step in the converging contoured restriction for allowing a mismatch between machining operations.

17. A valve comprising:
   an inlet having an inlet passage;
   a nozzle area in fluid communication with the inlet passage, the nozzle area having a sloped nozzle throat, the sloped nozzle throat having surfaces tangent to a direction of fluid flow to inhibit flow separation;
   an outlet in fluid communication with the sloped nozzle throat; and
   a valve needle adaptable to move between a closed position in contact with the sloped nozzle throat and an open position away from the sloped nozzle throat, the valve needle having a nearly cylindrical area upstream of an axial location where the valve needle begins to taper in a direction from upstream to downstream to provide the flow versus stroke characteristic of the valve body.

18. The valve of claim 17 wherein the nearly cylindrical area has a length to diameter ratio of one of less than one and approximately equal to one.

19. The valve of claim 17 wherein the fuel inlet is orthogonal to the fuel outlet.

20. The valve of claim 19 wherein the inlet passage is curved, thereby forcing inlet flow to the sloped nozzle throat in a more uniform manner.

21. The valve of claim 20 wherein the curved flow path and a converging contoured restriction are adapted to prevent flow from separating along the inlet passage and to provide a relatively thick boundary layer at the nozzle throat.

22. The valve of claim 17 further comprising a converging contoured restriction upstream of the sloped nozzle throat, the converging contoured restriction being shaped such that the area gradient starts slightly negative and becomes increasingly negative closer to the sloped nozzle throat.

23. The valve of claim 22 wherein the area gradient is shaped in a manner such that the area gradient is such that the converging contoured restriction initially curves inward and then outward.

24. The valve body of claim 17 wherein the valve needle has one of a conical step and a spherical step in the outside diameter of the valve needle, the one of the conical step and the spherical step adapted to contact the sloped nozzle throat such that a tight shutoff is provided when the valve needle is at a fully closed position.

25. The valve body of claim 17 wherein the valve needle has a valve stem that has a diameter that is smaller that the diameter of the nearly cylindrical area such that vorticity of flow that passed by the valve stem to a side opposite the inlet passage is minimized.

26. The valve body of claim 25 further comprising a tapered transition between the valve stem having a smaller diameter and the nearly cylindrical area.

27. A valve comprising:
   an inlet adapted to connect to an inlet pipe, the inlet having a curved inlet passage having a cross-sectional area that is smaller than the inlet pipe cross-sectional area;
   a nozzle area in fluid communication with the curved inlet passage, the nozzle area having a sloped nozzle throat, the sloped nozzle throat having surfaces tangent to a direction of fluid flow to inhibit flow separation;
   an outlet in fluid communication with the sloped nozzle throat; and
   a valve needle adaptable to move between a closed position in contact with the sloped nozzle throat and an open position away from the sloped nozzle throat, the valve needle having a nearly cylindrical area upstream of an axial location where the valve needle begins to taper.

28. The valve of claim 27 wherein the cross-sectional area of the curved inlet passage starts adjacent to the inlet piping, the cross-sectional area of the curved inlet passage configured to generate a gas flow path that is eccentric to the inlet piping, the gas flow path immediately adjacent to the inlet passage being as far away as possible from an outlet flange.

29. The valve of claim 27 wherein the cross-sectional area of the curved inlet passage is shaped such that the radius of curvature measured orthogonal to flow direction is smaller on the side of the flow path that has a smaller radius of curvature measured parallel to the flow direction than the side of the flow path that has a larger radius of curvature measured parallel to the flow direction.

30. The valve of claim 27 wherein the cross-sectional area of the curved inlet passage has an approximately elliptical shape.

31. The valve of claim 27 wherein the fuel outlet has a diffuser that is shaped such that the area gradient of the diffuser increases from an initial start position near the sloped nozzle throat to a maximum value and drops to near zero at a boundary of the fuel outlet.

32. The valve of claim 31 wherein an inner diameter of the initial start position is smaller than the inner diameter of the sloped nozzle throat, the initial start position being downstream of the sloped nozzle throat.

33. The valve of claim 27 further comprising a converging contoured restriction between the sloped nozzle throat and the curved inlet passage.

34. The valve of claim 33 wherein the converging contoured restriction is shaped such that the area gradient of the converging contoured restriction starts at near zero and becomes increasingly negative as the converging contoured restriction nears the sloped nozzle throat.

35. A valve comprising:
an inlet adapted to connect to an inlet pipe, the inlet having a curved inlet passage;
a nozzle area in fluid communication with the inlet passage, the nozzle area having a sloped nozzle throat and a an uninterrupted annular converging contoured restriction upstream of the sloped nozzle throat, the sloped nozzle throat having surfaces tangent to a direction of fluid flow to inhibit flow separation;
an outlet in fluid communication with the sloped nozzle throat, the outlet having a diffuser that is shaped such that the area gradient of the diffuser increases from an initial start position near the sloped nozzle throat to a maximum value and drops to near zero at a boundary of the outlet; and
a valve needle adaptable to move between a closed position in contact with the sloped nozzle throat and an open position away from the sloped nozzle throat, the valve needle having a nearly cylindrical area upstream of an axial location where the valve needle begins to taper to provide the flow versus stroke characteristic of the valve body.

36. The valve of claim 35 wherein the nearly cylindrical area has a length to diameter ratio of one of approximately equal to one and less than one.

37. The valve of claim 35 wherein the converging contoured restriction is shaped such that the area gradient of the converging contoured restriction starts at near zero and becomes increasingly negative as the converging contoured restriction nears the sloped nozzle throat.

38. The valve of claim 35 wherein an inner diameter of the initial start position is smaller than the inner diameter of the sloped nozzle throat, the initial start position being downstream of the sloped nozzle throat.

39. The valve of claim 35 wherein the cross-sectional area of the curved inlet passage starts adjacent to the inlet piping, the cross-sectional area of the curved inlet passage configured to generate a gas flow path that is eccentric to the inlet piping, the gas flow path immediately adjacent to the inlet passage being as far away as possible from an outlet flange.

40. The valve of claim 35 wherein the cross-sectional area of the curved inlet passage is shaped such that the radius of curvature measured orthogonal to flow direction is smaller on the side of the flow path that has a smaller radius of curvature measured parallel to the flow direction than the side of the flow path that has a larger radius of curvature measured parallel to the flow direction.

41. The valve of claim 35 wherein the inlet is adapted to connect to an inlet pipe having a cross-sectional area and wherein the inlet passage has a cross-sectional area at a location adjacent the inlet that is smaller than the cross-sectional area of the inlet pipe.

42. The valve of claim 35 wherein the diffuser extends beyond an outlet flange of the outlet.

43. The valve of claim 35 wherein an initial length of an outlet pipe connected to the diffuser has a smaller inner diameter than the outlet pipe inner diameter, thereby extending the diffuser.

44. The valve of claim 35 further comprising an outward step in the converging contoured restriction for allowing a misalignment between machining operations.

* * * * *